United States Patent [19]

Singer et al.

[11] Patent Number: 5,993,559
[45] Date of Patent: Nov. 30, 1999

[54] METHOD FOR REMOVING TIN

[75] Inventors: Robert Singer, Erlangen; Peter Krug, Nürnberg; Winfried Esser, Bochum; Jürgen Ewald, Mühlheim an der Ruhr; Jürgen Preuhs, Oberhausen; Adolf Donner, Bochum, all of Germany

[73] Assignee: Siemens Aktiengesellschaft, Munich, Germany

[21] Appl. No.: 09/061,374

[22] Filed: Apr. 16, 1998

Related U.S. Application Data

[63] Continuation of application No. PCT/DE96/01962, Oct. 16, 1996.

[51] Int. Cl.⁶ .................... C23G 1/02; C23G 1/14
[52] U.S. Cl. .................... 134/2; 134/3; 134/28; 134/29; 134/41
[58] Field of Search ............... 134/2, 3, 28, 29, 134/41; 216/96, 103, 106, 108

[56] References Cited

U.S. PATENT DOCUMENTS

| | | | |
|---|---|---|---|
| 2,357,970 | 9/1944 | Rath | 134/2 |
| 2,711,364 | 6/1955 | Beach | 134/3 |
| 3,121,005 | 2/1964 | Edwards | 134/2 |
| 4,164,542 | 8/1979 | Deren | 423/90 |
| 4,687,545 | 8/1987 | Williams et al. | 216/107 |
| 5,290,362 | 3/1994 | Sue | 134/2 |

FOREIGN PATENT DOCUMENTS 2 012 815  8/1979  United Kingdom.

OTHER PUBLICATIONS

"Handbuch der Galvanotechnik", manual for galvanotechnics, part III, pp. 340–341, Carl Hanser Verlag, Munich, 1969.

*Primary Examiner*—Randy Gulakowski
*Assistant Examiner*—Saeed Chaudhry
*Attorney, Agent, or Firm*—Herbert L. Lerner; Laurence A. Greenberg

[57] ABSTRACT

In a method for removing tin from a surface and/or from a region close to the surface of a component part, the component part has a concentrated aqueous sodium hydroxide or concentrated hydrochloric acid flowing in contact with it at a temperature which is distinctly higher than room temperature. Preferably, the temperature is approximately 220° C., and the component part is moreover subjected to a positive pressure of 5.5 bar. The method is suitable for a component part fabricated through the use of unidirectional solidification and liquid-metal cooling, in particular a turbine blade.

14 Claims, 2 Drawing Sheets

METHOD FOR REMOVING TIN

CROSS-REFERENCE TO RELATED APPLICATION

This application is a continuation of International Application Ser. No. PCT/DE96/01962, filed Oct. 16, 1996, which designated the United States.

BACKGROUND OF THE INVENTION

Field of the Invention

The invention relates to a method for removing tin from the surface and/or from a region close to the surface of the component part. Furthermore, the invention relates to an application of the method to a component part, in particular a turbine blade.

European Patent Application 0 631 832 A1 describes the fabrication of a component part by unidirectional solidification of a metal melt. That involves filling a mold with an alloy melt which forms the component part, wherein the mold is maintained in a heating chamber at a temperature above the melting temperature of the alloy. The mold containing the molten alloy is introduced continuously into a bath having a cooling fluid, with unidirectional solidification thus being induced. In order to avoid heat currents and to establish a high temperature gradient, the cooling fluid is covered with a thermally insulating layer that is made of free-flowing material, through which the mold is lowered into the cooling fluid.

A possible cooling fluid is molten tin having a temperature of about 260° C., as described in German Published, Non-Prosecuted Patent Application DE 22 42 111 A1. If the mold is cooled through the use of a liquid metal (liquid metal cooling or LMC), there is the possibility that the liquid metal, for example liquid tin, may come into direct contact with the solidified alloy through cracks in the mold. In that case, the tin may adhere to the surface (tin accretion) or form a compound with the alloy in a region close to the surface (tin enrichment). In the course of a heat treatment of the cast component part, which may follow the casting process, there is the possibility of more tin diffusing into the component part. There is a consequent risk of the mechanical properties and the corrosion characteristic of the component part being impaired.

German Published, Non-Prosecuted Patent Application DE 36 04 792 A1 describes a method for the fabrication of tin-free articles by deep-drawing or ironing tin-plated sheet iron. A tin coating on a latten, for example for making tin cans, is removed through the use of a strong alkali such as sodium hydroxide.

SUMMARY OF THE INVENTION

It is accordingly an object of the invention to provide a method for removing tin from a surface and/or from a region close to the surface of a component part, which overcomes the hereinafore-mentioned disadvantages of the heretofore-known methods of this general type.

With the foregoing and other objects in view there is provided, in accordance with the invention, a method for removing tin from a surface and/or a region close to a surface of a component part, in particular a metallic component part, which comprises forcing a tin removal fluid to flow in contact with a component part at a temperature above 95° C. and at a positive pressure between 3 bar and 6 bar.

In accordance with another mode of the invention, the tin removal fluid is concentrated aqueous sodium hydroxide or concentrated hydrochloric acid.

It is advantageous to cause the aqueous sodium hydroxide to be in motion, so that the aqueous sodium hydroxide is flowing in contact with the component part. In this way a higher removal rate of the tin is thus achieved than if there is no flow in contact with the component part.

In accordance with a further mode of the invention, a turbulent flow is placed in contact with the component part.

A turbulent flow effectively prevents the aqueous sodium hydroxide from becoming at all saturated with tin ions at the surface of the component part.

In order to implement the method at a positive pressure from 3 to 6 bar, the method can preferably be carried out in a pressure-proof container, a so-called autoclave, in which an appropriate positive pressure can be generated. A positive pressure of 3 bar in this context means an additional pressure in excess of atmospheric pressure. A suitable pressure container is preferably made of a steel which is resistant to concentrated aqueous sodium hydroxide at high temperatures and at the pressures stated.

In accordance with an added mode of the invention, the method is implemented at a positive pressure of between 3 and 4 bar, in particular at 3.5 bar, and at a temperature of between 110° C. and 170° C., in particular at 140° C.

In accordance with an additional mode of the invention, the combination of positive pressure and temperature is a positive pressure of between 5 and 6 bar, in particular at 5.5 bar, and a temperature of between 180° C. and 240° C., in particular about 220° C. This combination is distinguished by the fact that in the course of the fabrication of a unidirectionally solidified component part, a treatment of the component part, in the case having the above-mentioned combination, with concentrated aqueous sodium hydroxide, to remove accretions from the mold, takes place in any case. Surprisingly, experiments demonstrated that this is accompanied, at the same time, by removal of the tin. A suitable choice of the time span for this process, achieving a flow in contact with the component part and/or maintaining a high concentration of the aqueous sodium hydroxide, thus permits direct integration of the method for removing tin into the fabrication process of a component part, without further additional measures.

The use of concentrated aqueous sodium hydroxide at an elevated temperature leads to selective detachment or leaching of tin and/or tin-containing phases from a component part, with other regions of the alloy that forms the component part essentially not being attacked by the concentrated aqueous sodium hydroxide. As a result of the method for removing tin, the component part therefore remains essentially undamaged and has the desired mechanical properties and corrosion characteristics. The temperature is above 45° C., preferably above 95° C.

The component part is exposed to the aqueous sodium hydroxide for a presettable period of time, with the concentration of the aqueous sodium hydroxide being kept at a largely constant level during this time. The period of time may be a number of days, in particular 11 days. Preferably, the component part is immersed in a bath of aqueous sodium hydroxide and remains in the bath, without a break, during the presettable period of time.

In accordance with yet another mode of the invention, the aqueous sodium hydroxide contains a fraction in per cent by weight (wt %) of from 30 wt % to 60 wt %, in particular 33%, of sodium hydroxide (NaOH).

When tin comes into contact with the surface of a basic metal, a surface layer of pure metallic tin is formed. In addition, particularly in the case of a nickel-base alloy, intermetallic compounds between tin and the base metal, in particular nickel, will arise. In some cases, they are not attacked by the tin removal fluid to any great effect. Elimination of those intermetallic compounds is achieved by the method at distinctly elevated temperature, having a flow in contact with the component part and or elevated pressure, by virtue of the tin-rich matrix which surrounds the intermetallic compounds being completely dissolved. Thus the intermetallic compounds drop out and are carried away by the tin removal fluid. In addition, the intermetallic compounds are also attacked directly by concentrated hydrochloric acid. As compared with methods for removing tin, which use acids with additions of hydrogen peroxide or other oxidants, the method according to the invention avoids any attack on the base metal, in particular a nickel-base alloy. Methods employing acids and such additives would moreover lead to a black precipitate of amorphous tin on the component part, and that precipitate would have to be removed separately.

A likewise selective removal of tin and/or tin-containing phases from the surface and/or from the region close to the surface of a component part is achieved if the component part is exposed to concentrated hydrochloric acid, wherein the concentrated hydrochloric acid preferably contains a percentage, by weight, of about 37% of HCl. The method is distinctly effective even at room temperature. It is therefore suitable for removing tin for the purpose of indirect detection of tin, since dissolved tin in the hydrochloric acid can be detected. The use of concentrated hydrochloric acid in the case of pure nickel-tin alloys, with selectivity of the reaction being assured even at a low tin content of a few per cent by weight, is particularly beneficial. In the case of intermetallic nickel-tin compounds, the main effect of the hydrochloric acid is to dissolve a tin matrix surrounding the intermetallic nickel-tin phase and thereby to leach out the entire intermetallic phase. The method employing concentrated hydrochloric acid is particularly important in the case of a nickel-base superalloy.

In accordance with yet a further mode of the invention, the method for removing tin is applied to a metallic component part of a gas turbine installation, in particular a turbine blade, a heat shield of a combustion chamber, or a guide ring segment.

In accordance with yet an added mode of the invention, the component part is one which has been solidified unidirectionally in a bath of liquid tin. The component part may be fabricated, for example, according to one of the fabrication methods described in European Patent Application 0 631 832 A1 or German Published, Non-Prosecuted Patent Application DE 22 42 111 A1.

In accordance with a concomitant mode of the invention, the component part is formed of a nickel-base alloy, in particular a superalloy. In the case of such a component part which, like a turbine blade or a heat shield element is exposed to elevated corrosive and mechanical stresses, it is particularly important that the tin accreted or alloyed during fabrication is completely removed. Any tin accretions or tin enrichment that is present may have an adverse effect, particularly on the mechanical strength and corrosion resistance of the component part. The method for removing tin through the use of concentrated aqueous sodium hydroxide or concentrated hydrochloric acid at a high temperature with excess pressure and/or a flow in contact with the component part makes it possible for the component part to be freed selectively from the unwanted tin immediately after the fabrication method, with only minor modifications of the process sequence and, if required, the fabrication equipment.

Due to the possible effect of accretions or enrichment of tin on the material characteristics of the component part it is desirable not only for the tin to be completely removed but for this also to be detectable. A method for the detection of tin located on the surface of a component part and/or alloyed in a region close to the surface, which is suitable for this purpose, involves exposing the component part to a tin-free concentrated hydrochloric acid solution and analyzing the solution, after a presettable period of time, for the presence of dissolved tin. If the analysis for dissolved tin has a negative result, it proves that the tin had been completely removed. The component part is exposed to the concentrated hydrochloric acid solution by immersion into a bath or by largely spotwise application of the hydrochloric acid solution, for example in the form of a spray mist.

The detection of tin which was dissolved by the concentrated hydrochloric acid and is present in the form of bivalent or quadrivalent ions, is preferably carried out through a chemical color reaction. The optical evaluation of the color reaction provides an unambiguous inference with respect to the tin content in the solution and thus also with respect to the amount of tin still present in the component part, taking into account the ablation rate of the concentrated hydrochloric acid solution. Therefore, this provides a choice of how and for how long any further removal of tin should proceed. Possible color reactions and other detection methods for tin in the hydrochloric acid solution are described in detail, for example, in the book entitled "Handbuch der Spurenanalyse" [Handbook of Trace Analysis] by O. G. Koch, ed. G. A. Roch-Dedic, Parts 1 and 2, Springer Verlag, Berlin, 1974. Examples which may be pointed out in this context are the use of molybdophosphates and gold trichloride, which lead to chemical color reactions by conversion to molybdenum blue and purple of Cassius. The detection limit for a photometric analysis at a wavelength of 290 nm is about 35 ppm of tin ions. That detection limit is unaffected by a concentration of nickel ions even as high as 1000 ppm. A further detection method is to apply X-ray fluorescence analysis to the concentrated hydrochloric acid solution.

Other features which are considered as characteristic for the invention are set forth in the appended claims.

Although the invention is illustrated and described herein as embodied in a method for removing tin, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
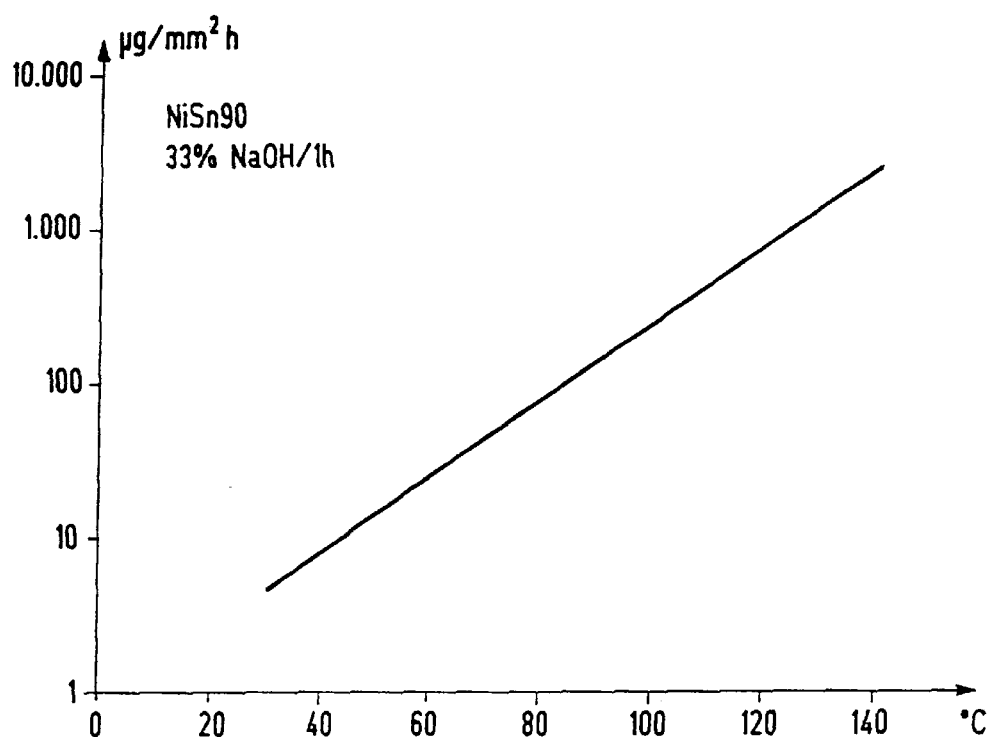
FIG. 1 is a graph which shows an effect of temperature on the removal of tin, for a nickel-tin alloy.

Referring now to the figures of the drawings in detail and first, particularly, to FIG. 1 thereof, there is seen a graph which illustrates a specific weight loss in micrograms per square millimeter and hour, for a nickel-tin alloy containing 90% tin, as a function of temperature when an aqueous sodium hydroxide with a fraction of 33 wt % of sodium hydroxide is used. In the process, the aqueous sodium hydroxide was kept at atmospheric pressure, i.e. ambient pressure, up to a temperature of 100° C., and it was subjected to a positive pressure of 3.5 bar at a temperature of 140° C. The specific weight loss has been plotted logarithmically, and it can be clearly seen that an increase in temperature goes hand in hand with a distinct increase in the specific weight loss, i.e. the amount of tin removed per unit area and time.

Figure 2:
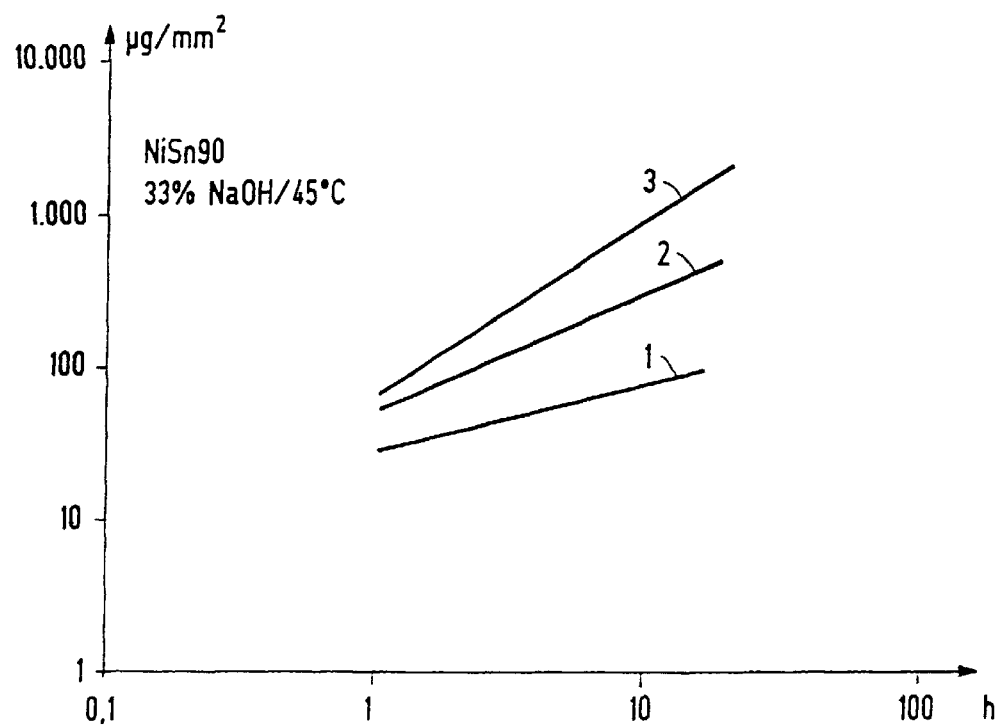
FIG. 2 is a graph that shows the effect of flow on the ablation of tin in the case of a nickel-tin alloy.

FIG. 2 shows the area-specific weight loss on a logarithmic scale plotted against time, for a nickel-tin alloy containing 90 wt % of tin. The alloy was exposed to a concentrated aqueous sodium hydroxide containing 33 wt % of sodium hydroxide, at a temperature of 45° C. A measured curve indicated by reference symbol 1 represents a result for laminar flow in contact with the alloy and for natural convection. A measured curve indicated by reference symbol 2 shows a result of a laminar flow in contact with the alloy with forced convection. A measured curve denoted by reference symbol 3 represents a result of a turbulent flow in contact with the alloy and forced convection. It can be clearly seen that the highest area-specific weight loss occurs with a turbulent flow in contact with the alloy.

Figure 3:
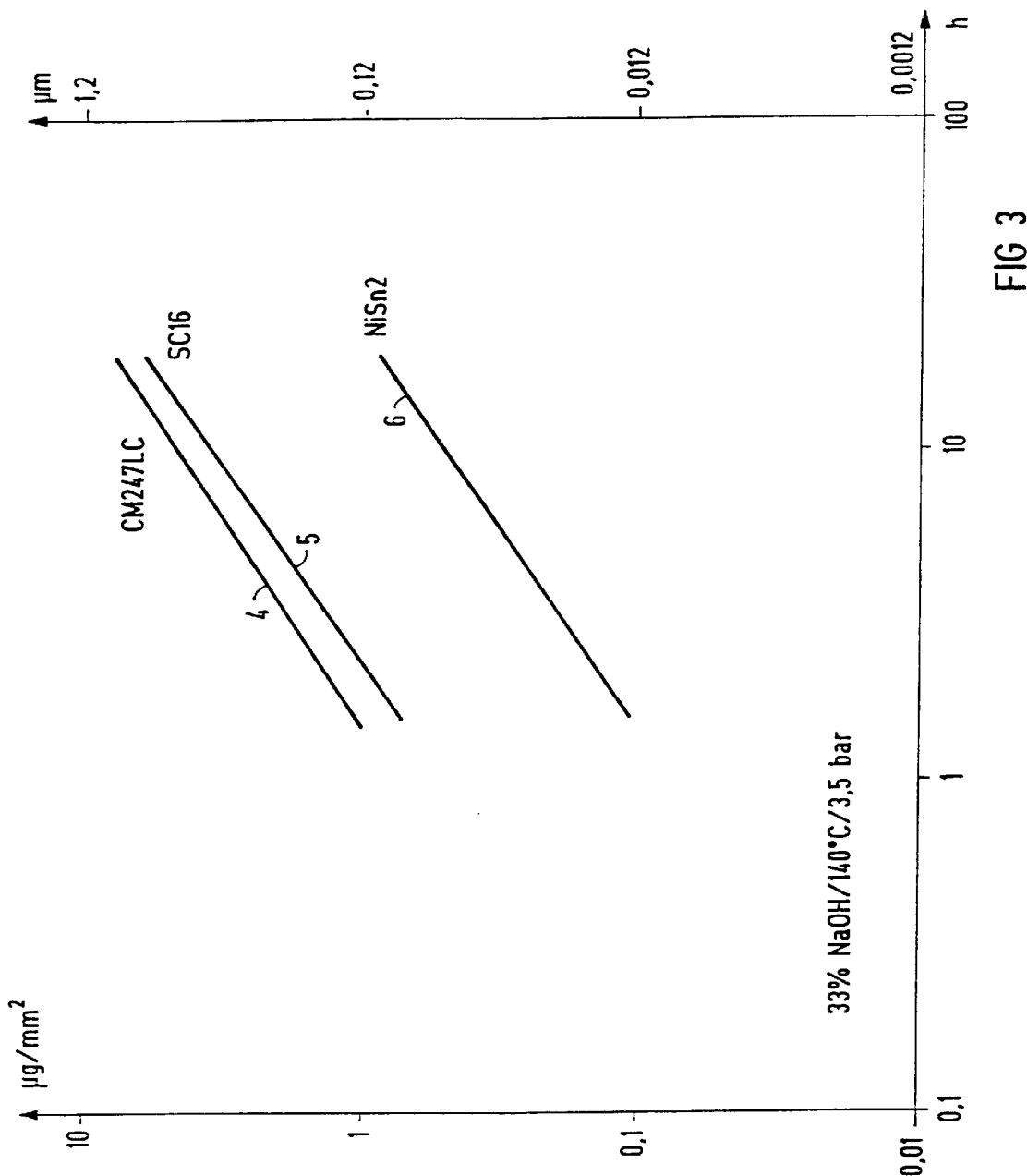
FIG. 3 is a graph which shows the ablation of tin for various nickel-base alloys.

FIG. 3 represents an area-specific weight loss and an ablation or removal rate for various nickel-base alloys which had been exposed to a concentrated aqueous sodium hydroxide containing 33 wt % of sodium hydroxide at a temperature of 150° C. and a positive pressure of 3.5 bar. For all of the alloys it can be clearly seen that the weight loss distinctly increases with time. The weight loss is highest for a nickel superalloy being formed of a portion of 0.07% carbon, 8.1% chromium, 9.2% cobalt, 0.5% molybdenum, 9.5% tungsten, 3.2% tantalum, 5.6% aluminum, 0.7% titanium, 0.015% boron, 0.02% zirconium, 1.4% hafnium and a remainder of nickel (all of the data in per cent by weight). The trend of the weight loss, which is plotted herein on a log-log scale against time, can be seen from a measured curve having reference symbol 4. A measured curve with reference symbol 5 shows a slightly lower area-specific weight loss for a nickel superalloy with a portion (data in per cent by weight) of carbon <0.01%, chromium 16%, molybdenum 3%, tantalum 3.5%, aluminum 3.5%, titanium 3.5%, boron <0.005%, zirconium <0.008% and a remainder being nickel. A further measured curve 6 applies to a nickel-tin alloy containing 2 wt % of tin.

The invention is distinguished by a method for removing tin from the surface and/or from a region close to the surface of the component part, with the tin being removed selectively from the component part through the use of concentrated aqueous sodium hydroxide or concentrated hydrochloric acid. This method ensures complete removal of tin which, for example during the fabrication of a turbine blade through the use of the method of unidirectional solidification, followed by liquid-metal cooling, had accreted or accumulated on the turbine blade or had been alloyed in a region close to the surface. Implementation of the method makes it possible to extend the fabrication process of turbine blades in such a way that removal of the tin, inter alia, is achievable directly and, as a result, possible effects on the corrosion resistance and mechanical strength of the turbine blade can be precluded.

We claim:

1. A method for removing tin from at least one of a surface and a region close to a surface of a component part, which comprises:

forcing a tin removal fluid to flow in contact with a component part maintaining the component part in contact with the tin removal fluid at a temperature above 95° C. and at a positive pressure between 3 bar and 6 bar in a closed pressure vessel.

2. The method according to claim 1, which comprises generating a turbulent flow in contact with the component part.

3. The method according to claim 1, which comprises setting the positive pressure between 3 bar and 4 bar, and setting the temperature between 110° C. and 170° C.

4. The method according to claim 1, which comprises setting the positive pressure at 3.5 bar, and setting the temperature at about 140° C.

5. The method according to claim 1, which comprises setting the positive pressure between 5 bar and 6 bar, and setting the temperature between 180° C. and 240° C.

6. The method according to claim 1, which comprises setting the positive pressure at 5.5 bar, and setting the temperature at about 220° C.

7. The method according to claim 1, which comprises selecting the tin removal fluid as concentrated aqueous sodium hydroxide.

8. The method according to claim 1, which comprises selecting the tin removal fluid as concentrated aqueous sodium hydroxide containing between 30 wt % and 60 wt % of sodium hydroxide (NaOH).

9. The method according to claim 1, which comprises selecting the tin removal fluid as concentrated aqueous sodium hydroxide containing 33 wt % of sodium hydroxide (NaOH).

10. The method according to claim 1, which comprises selecting the tin removal fluid as concentrated hydrochloric acid.

11. The method according to claim 1, which comprises selecting the component part from the group consisting of a gas turbine component part, a turbine blade, a heat shield element and a guide ring segment.

12. The method according to claim 11, which comprises selecting the component part as a component part having been solidified unidirectionally in a bath of liquid tin.

13. The method according to claim 1, which comprises selecting the component part as a component part formed of a nickel-base alloy.

14. The method according to claim 1, which comprises selecting the component part as a component part formed of a superalloy.

* * * * *

UNITED STATES PATENT AND TRADEMARK OFFICE
CERTIFICATE OF CORRECTION

PATENT NO : 5,993,559
DATED : November 30, 1999
INVENTOR(S) : Robert Singer et al.

It is certified that error appears in the above-identified patent and that said Letters Patent is hereby corrected as shown below:

On the title page:

Item [30] should read as follows:

Oct. 16, 1995     [DE]    Germany .......... 195 38 440.7

Signed and Sealed this

Seventh Day of November, 2000

Attest:

Q. TODD DICKINSON

Attesting Officer     Director of Patents and Trademarks